United States Patent [19]

Noss

[11] Patent Number: 4,484,294

[45] Date of Patent: Nov. 20, 1984

[54] METHOD AND APPARATUS FOR MODIFICATION OF A PRERECORDED PROGRAMMED SEQUENCE OF MOTIONS DURING EXECUTION THEREOF BY A ROBOT

[75] Inventor: Jeffrey S. Noss, Bay Village, Ohio

[73] Assignee: Nordson Corporation, Amherst, Ohio

[21] Appl. No.: 354,315

[22] Filed: Mar. 3, 1982

[51] Int. Cl.³ .................. G06F 15/46; G05B 19/42
[52] U.S. Cl. .................. 364/513; 318/568;
364/193; 901/3; 901/7; 901/43
[58] Field of Search ............ 364/513, 474, 478, 171,
364/188, 189, 146, 147, 191, 192, 193; 318/568;
414/730, 744; 239/69, 70; 901/2-5, 7, 41-43

[56] References Cited

U.S. PATENT DOCUMENTS

| | | |
|---|---|---|
| 3,971,000 | 7/1976 | Cromwell ............ 364/189 X |
| 4,021,651 | 5/1977 | Mitsuhashi et al. . |
| 4,025,838 | 5/1977 | Watanabe . |
| 4,132,938 | 1/1979 | Sano et al. . |
| 4,140,953 | 2/1979 | Dunne . |
| 4,409,649 | 10/1983 | Heeger ............ 364/144 |

Primary Examiner—Joseph F. Ruggiero
Attorney, Agent, or Firm—Wood, Herron & Evans

[57] ABSTRACT

A method and apparatus for real time editing, or modifying, of a program of prerecorded robot motions stored in a robot controlled memory while it is being processed by the controller for subsequent storage of the program, as edited, in memory and output to the robot for execution.

14 Claims, 10 Drawing Figures

POSITIVE/NEGATIVE INCREMENT SWITCH SUBROUTINE

Fig. 5b

RETURN SWITCH SUBROUTINE

COMMAND IDENTITY

Fig. 7

METHOD AND APPARATUS FOR MODIFICATION OF A PRERECORDED PROGRAMMED SEQUENCE OF MOTIONS DURING EXECUTION THEREOF BY A ROBOT

This invention relates to a work-performing robot which executes a prerecorded sequence of motions stored in a robot controller memory, and more particularly, to an apparatus and method for editing, or modifying, a program during processing by the robot controller immediately prior to input to the robot such that the program, as modified, is both executed by the robot and stored in the controller memory for subsequent repetitive reply or re-execution by the robot.

A work-performing robot, or manipulator, typically includes a plurality of links which are pivotally connected end-to-end at joints. Located at each joint is a rotary actuator, usually of the electrohydraulic type, which is responsive to an electrical signal for controlling the relative position, or angle, between the two links connected at the joint. Also located at each joint is an angular position transducer, for example, a resolver, which provides an electrical output signal correlated to the relative position or angle of the links at the joint. At the outboard end of the outermost link, a device, such as a spray coating gun, is secured for performing work on a workpiece located at a work station as the robot executes a prerecorded sequence of motions.

Associated with the work robot is a computerized robot controller in which is stored in a memory thereof a prerecorded sequence of position commands. During program execution, or replay, the stored position commands are sequentially fetched from the memory, compared with current samples of actual robot position, and positional errors calculated corresponding to the difference between the position commands and the then current actual robot position, and the positional errors output from the controller to the robot to drive the robot to the desired or command position.

Since the robot has plural axes or links which are separately controlled and driven by their respective actuators, each position command in the prerecorded sequence in reality constitutes a set of individual position command components corresponding to the different axes or links of the robot. Depending upon the data processing capability of the controller, the individual position command components associated with the different robot links will be processed either serially or in parallel by the controller in the course of producing the positional error signals output to the different robot link actuators. The set of position command components, regardless of whether individually processed by the controller in series or parallel, are retrieved from the controller memory for execution by the robot on a serial basis. If a programmed sequence of motions has N position commands and the robot has M axes, there are NM discrete robot link position commands which are grouped in N sequential sets of M link commands. During program execution, the N sets of M link commands are executed serially by set, and either serially or parallel by link command.

Production of the prerecorded motion sequence, known as robot "training" or "teaching", can be accomplished in several ways. In accordance with one approach, a joy stick is used to control the robot actuators during programming such that the robot links move to position the robot output element in accordance with manual manipulation of the joy stick. The outputs of the robot link position transducers of the robot are periodically sampled and stored for subsequent execution by the robot without the aid of the joy stick.

In a second approach, a lightweight "training robot" is used which, except for the mass of the training robot and the absence of actuators for the links, is identical in all respects to the considerably more massive work robot being programmed. To program the work robot, the output element of the training robot is grasped manually by the individual doing the programming and moved through a sequence of motions which it is desired to have the work robot subsequently execute. Since the training robot is lightweight, it can be moved manually by the operator with little difficulty. As the training robot is being moved through the desired sequence of motions, position transducers at the joints of its links provide electrical link position signals which are recorded for subsequent reproduction and input to the actuator servoloops of the work robot.

A third method of robot programming involves bypassing or decoupling the actuators of the work robot and counter-balancing the work robot such that the operator may more easily move it through the desired path. The robot link position transducer outputs are recorded during this manual programming phase such that they can be subsequently replayed for execution by the robot.

A still further approach involves providing the work robot with motion or force sensing transducers When an operator attempts to move the work robot during manual programming, the force or motion sensors detect the force or motion applied by the operator to the robot. The force or motion sensor outputs are input to the actuators for moving the individual work robot links in accordance with the manual force or motion applied thereto by the operator As the robot links move under power assistance, the link position transducer outputs are recorded for subsequent replay and execution by the robot.

During training of a spray painting robot having a manual trigger-operated ON/OFF solenoid valve designed to control the flow of coating from the spray gun, and in conjunction with periodic sampling and storing of the robot link position transducer outputs to produce the recorded motion sequence which is desired to thereafter replay for execution by the robot, the status of the manual, trigger-operated ON/OFF flow control solenoid valve is sampled and stored as solenoid valve commands. When the robot program is thereafter replayed, the recorded sequence of ON/OFF solenoid valve commands are output to the spray gun in synchronism with the sequence of robot position commands, thereby coordinating spray coating emission with spray gun position.

In robots used for spray coating objects of various configurations and shapes, it sometimes occurs that the position of the object being coated relative to the robot during the programming phase has changed since the robot was programmed, with the result that if the program is executed by the work robot, the part will not be satisfactorily spray coated because the part is not in the same position relative to the work robot during program execution as it was during programming. The change in the relative position of the robot and article being coated may be due to a change in the location of the conveyor on which the articles are transported, a change in the length of the hooks on which the articles are supported from the conveyor, or the like.

When there is a change in the article-robot relationship between robot programming and program execution, reprogramming may be necessary, particularly if the difference is substantial. If reprogramming is necessary, typically the entire program must be redone since all position commands are adversely affected by the changed relationship between the robot and the article being coated.

Another circumstance giving rise to the necessity to reprogram an entire spray painting robot motion sequence is when the nozzle of the spray gun is changed such that the spray pattern is directed at a different angle relative to the spray gun which is secured to the output link of the robot. While the relative position between the article being coated and the robot has not changed, because the spray gun nozzle has been changed, in turn changing the direction of the spray pattern, the relative position of the article being coated and the spray pattern changes, necessitating reprogramming of the entire motion sequence.

A further situation arising in practice necessitating reprogramming, albeit not of the entire motion sequence, is when the size or shape of the article being coated is changed between the time of robot programming and program execution by the robot. For example, if the design of a vertically suspended rectangular frame is altered such that a horizontal reinforcing bar spanning opposite vertical sides of the rectangular frame is raised or lowered relative to the upper and lower extremities of the frame, the portion of the prerecorded sequence of motions which control the robot to spray coat the horizontal reinforcing bar will no longer properly locate the spray gun relative to the bar, although proper location of the gun relative to the rectangular frame will be provided. Under such circumstances, and while it is unnecessary to reprogram the portion of the motion sequence correlated to spray coating the rectangular frame itself, it is necessary to reprogram that portion of the motion sequence correlated to spray coating the repositioned, transverse, frame-reinforcing bar.

Accordingly, it has been an objective of this invention to provide a simple, inexpensive, and convenient apparatus and method for editing, or modifying, a programmed sequence of motions for a work robot link such that the modified sequence when input to the work robot will result in producing motion of the robot link which compensates for the change in either the spray gun nozzle and/or the position or configuration of the workpiece which rendered the previously recorded program partially or totally unusable. This objective has been accomplished in accordance with certain principles of the invention by conducting program editing or modification, with the aid of suitable manually-activated input means, during program processing by the robot controller immediately prior to input of position commands to the robot such that the program, as modified, is both executed by the robot and stored in the controller memory for subsequent replay or re-execution, thereby achieving what effectively constitutes real time program editing during program execution by the robot. An important advantage of this invention is that the operator, via the manually-activated input means, can not only edit the program under manual control, but can actually monitor the edited program as it is being executed by the robot, making further program changes as necessary and, again, on a real time basis.

In a preferred form of the invention, position command incrementing means responsive to activation of a manual "positive increment" switch or "negative increment" switch associated with a given robot link is provided which is operative to generate, and positive or negatively accumulate, sequential discrete signals correlated to positive or negative position increments by which it is desired to modify, i.e., increase or decrease, the position commands for a given robot link stored in the robot controller memory. The continuously changing, either increasing or decreasing, cumulative position increment is used to successively modify, either by adding or subtracting the cumulative increment, the individual position commands associated with a given robot link which are sequentially fetched from the robot controller memory prior to processing by the robot controller, which processing is effective to compare the successively modified position commands for the link in question with successively input actual robot link positions and derive therefrom for input to the robot link actuator successive positional error signals for successively driving the robot link to the successively modified command positions. Concurrent with processing of the modified position commands for execution by the work robot, the modified commands are also stored in the controller memory as substitutes for the original, unmodified position commands.

In the preferred form of the invention, when the manually activated "positive increment" or "negative increment" switch is released, the accumulated positional increment is preserved and added, or subtracted, as the case may be, to all subsequent position commands of the recorded sequence occurring after deactivation of the positive/negative increment switch means. As a result, the modification of the position command occurring immediately prior to deactivation of the positive/negative increment switch means is applied to all subsequently occurring position commands without further intervention of the operator. The practical effect of this is that if the fan spray relative to the article to be coated was several inches too low, due to either changing of the gun nozzle between program recording and program execution, a change in position of the articles on the conveyor, a change in position of the conveyor relative to the robot, or the like, once the proper position command modification has been achieved to restore the desired orientation between the robot and the workpiece, it is maintained for the remainder of the program without continued operator intervention.

In accordance with a further, and equally important aspect of the invention, a method and apparatus is provided, responsive to deactivation of the positive/negative increment switch, for automatically reducing to zero, in a controlled manner, the cumulative command position increment. In accordance with further principles of this invention, this objective is accomplished by automatically reducing the cumulative positional increment by one position increment upon execution of each position command subsequent to deactivation of the positive/negative increment switch until such time as the cumulative positional increment has been reduced to zero. Once zero is reached, subsequently occurring position commands are stored in memory and executed by the robot free of modification. Position commands fetched from memory during the interval between deactivation of the positive/negative increment switch and reduction of the cumulative position increment to zero are modified by cumulative increments of successively decreasing size.

Summarizing, with this invention a prerecorded sequence of robot commands can be modified and stored for subsequent replay simultaneously with execution of the modified commands by the work robot. In this way, it is possible for the operator to effectively modify under manual control a program while it is being executed by the robot. An advantage of this approach to editing position commands of a robot program is that the operator can see the effect of the position command program editing as actually executed by the work robot during the editing process. Stated differently, the operator can edit the program on a real time basis as it is being executed by the work robot. Moreover, the position command editing which occurs is on a cumulative basis, with the result that the duration of activation of the positive/negative increment switch means directly controls the size of the corrections of the position commands. Thus, the longer the positive/negative increment switch means is activated, the greater the correction that is achieved.

These and other features, objectives, and advantages of the invention will become more readily apparent from a detailed description thereof taken in conjunction with the drawings in which:

FIG. 3 is a circuit diagram in block format of a preferred embodiment of the invention.

Figure 1:
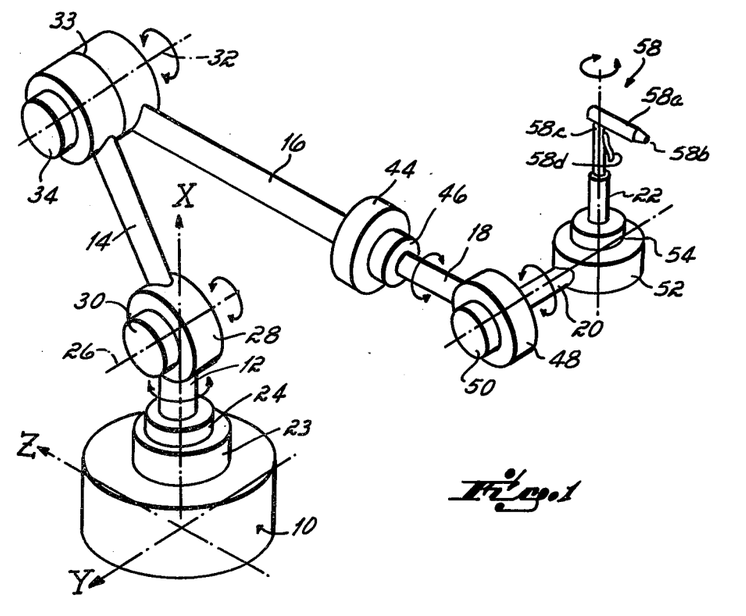
FIG. 1 is a perspective view, in schematic form, of a typical work-performing robot, or manipulator, showing the general relationship of the relatively massive robot links and their respectively associated actuators and position transducers.

With reference to FIG. 1, a typical work-performing robot, or manipulator, with respect to which this invention is useful for providing real time incrementing of position commands motions which the robot is to execute relative to a workpiece contained in a programmed series, is seen to include a base 10 which rests on the floor or other appropriate surface for supporting the robot. Extending from the base 10 are plural, series-connected, elongated, articulated members or links 12, 14, 16, 18, 20 and 22 which, in the preferred embodiment, provide the robot with several, in this instance six, degrees of freedom. In practice, the links 12, 14, 16, 18, 20, and 22 collectively constitute a relatively large mass. For example, the links 12, 14, and 16 are each approximately 1–4 feet in length, and typically weigh in the range of 10–400 pounds each. The links 18, 20, and 22 which, in the work-performing robot shown in FIG. 1 constitute a wrist, typically are significantly less massive than the links 12, 14 and 16, although this is not necessarily the case.

The link 12 is vertically disposed and mounted to the base 10 by a suitable joint which permits the link to rotate about its longitudinal axis which is coincident with the X axis. An actuator 23 is associated with the link 12, and is responsive to a position error signal provided by a conventional robot controller (not shown in FIG. 1) to facilitate selective, bidirectional, angular motion of the link 12 in an azimuthal direction about its longitudinal axis to the desired link position. Also associated with the link 12 is a position transducer 24 which provides an electrical signal correlated to the actual angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y-Z plane. Associated with the link 14 is an actuator 28 which is responsive to a position error signal from the robot controller and facilitates selective, bidirectional, elevational, pivotal movement of the link 14 about horizontal axis 26 to the desired link position. Also associated with the link 14 is a position transducer 30 which provides an electrical signal correlated to the actual elevational position of the link 14 relative to the link 12.

The link 16 at its inner end is connected to the upper end of the link 14 by a suitable joint for permitting the link 16 to move in a vertical plane about horizontal axis 32 which is parallel to axis 26. A suitable transducer 34 is associated with the link 16 for providing an electrical signal correlated to the actual angular elevational position of the link 16 with respect to the link 14. An actuator 33, associated with the link 16, is responsive to a position error signal from the robot controller and facilitates selective, bidirectional, elevational, pivotal movement of the link 14 about horizontal axis 32 to the desired link position.

The actuator 23 which bidirectionally drives the link 12 about the X axis provides the work-performing robot with one degree of freedom, namely, azimuthal positioning motion, while the actuators 28 and 33 which bidirectionally drive the link 14 and link 16, respectively, provide the robot with two degrees of freedom, each in an elevational direction.

The articulated links 18, 20, and 22 collectively constitute a wrist. Link 18 at its inner end is connected via a suitable joint to the outer end of the link 16. An actuator 44 is associated with the wrist member 18 for bidirectionally rotating, when input with suitable position error signals from the robot controller, the wrist member 18 to the desired link position about its longitudinal axis which is coincident with the longitudinal axis of the link 16. A suitable position transducer 46 is associated with the link 18 for providing an electrical signal correlated to the actual relative rotational position of the link 18 with respect to the link 16.

The link 20 is connected at its inner end via a suitable joint to the outer end of the link 18 for providing rotational movement of link 20 about its longitudinal axis which is perpendicular to the longitudinal axis of link 18. An actuator 48 is associated with link 20, and when input with suitable position error signals from the robot controller, bidirectionally rotates link 20 about its longitudinal axis perpendicular to the longitudinal axis of link 18 to the desired link position. A suitable position transducer 50 is also associated with link 20 for providing an electrical output correlated to the actual rotational position of this link relative to link 18.

Link 22 is connected via a suitable joint to the outer end of link 20 to facilitate rotation of link 22 about its longitudinal axis which is disposed perpendicularly to the longitudinal axis of link 20. An actuator 52 associated with link 22, when input with suitable position error signals from the robot controller, facilitates bidirectional motion of link 22 about its longitudinal axis to the desired link position. A transducer 54, also associated with link 22, provides an electrical signal output correlated to the actual relative rotational position of link 22 relative to link 20.

Link 22 constitutes the mechanical output element of the work-performing robot. While the mechanical output of the robot can be utilized for positioning a wide variety of devices, in the preferred form of the invention the work-performing robot is utilized to position a spray coating gun 58 having a barrel 58a with a nozzle 58b which emits coating particles. The gun handle 58c is mounted to the upper end of the wrist link 22. The gun handle 58c mounts a suitable trigger mechanism 58d which, when actuated by a suitable signal-operated device (not shown), functions to control the emission of coating particles from the nozzle 58b of the spray gun 58.

The longitudinal rotational axes of wrist links 18, 20, and 22 are mutually perpendicular, and accordingly constitute three degrees of freedom for the robot. These three degrees of freedom, coupled with the three degrees of freedom of the links 12, 14, and 16, provide a total of six degrees of freedom for the work-performing robot.

In the operation of the work-performing robot shown in FIG. 1, a series of programmed, i.e., desired, link position command signals stored in a suitable memory device of the robot controller are periodically retrieved and compared against the actual link position signals provided by the link position transducers 24, 30, 34, 46, 50, and 54, and in response thereto the link positional error signals are generated for each of the links 12, 14, 16, 18, 20, and 22. The positional error signals for the various links 12, 14, 16, 18, 20, and 22 are then input to the various link actuators, 23, 28, 33, 44, 48, and 52, which typically are of the servo-controlled electrohydraulic type, for moving the links to the desired, or programmed, command positions which in turn reduce the positional error signals to zero. Thus, the links of the work-performing robot of FIG. 1 are driven through the programmed sequence of desired motions, or command positions, utilizing closed-loop servo techniques, by periodically comparing desired position command signals retrieved from the memory of the robot controller with actual link position signals from their associated position transducers, and using the resulting positional error signals associated with the different links to drive the various link actuators to the desired, or programmed, command positions.

Figure 4A:
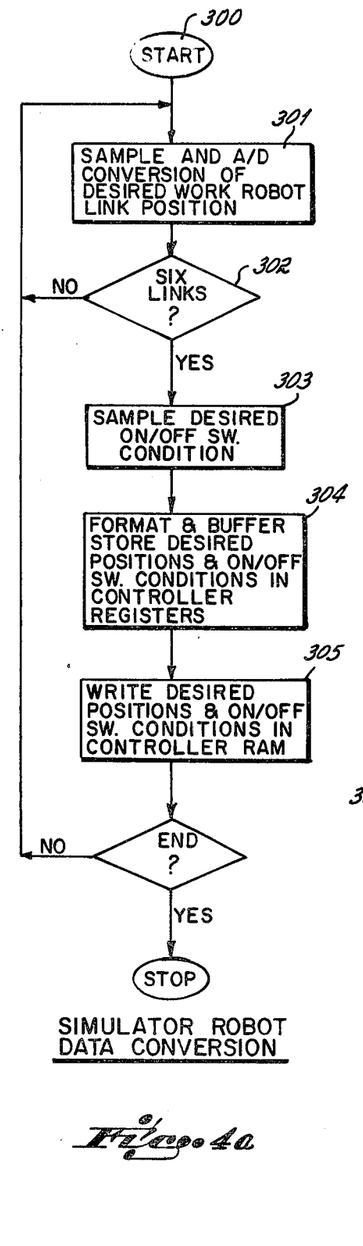
FIG. 4a is a flow chart of simulator robot data conversion for a robot system with which this invention is useful.
Figure 4B:
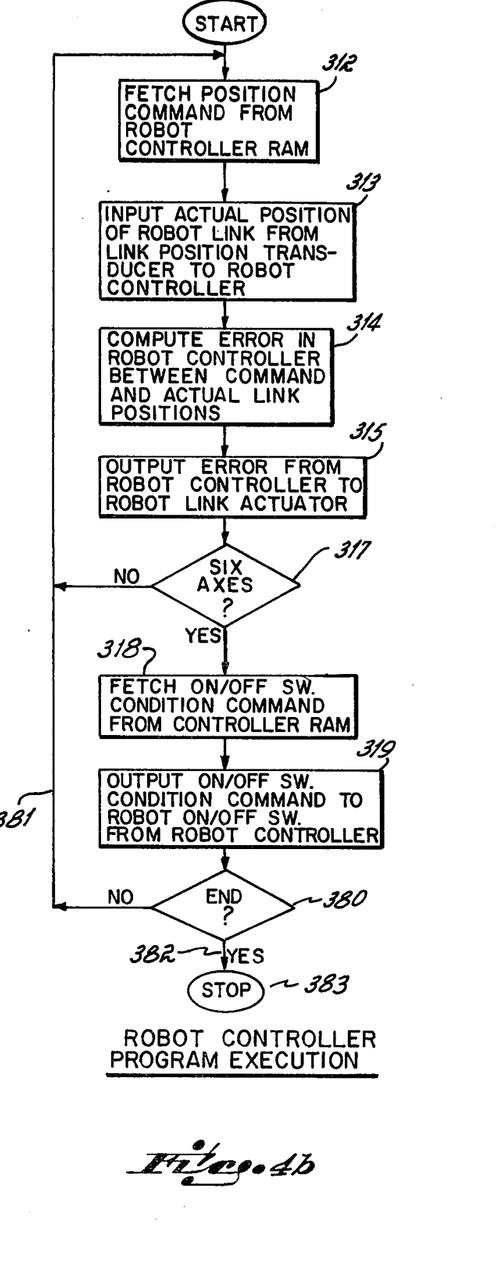
FIG. 4b is a flow chart of robot controller program execution for a robot system with which this invention is useful.

Since the robot controller, actuators, position transducers, closed-loop servo controls, and the like of the work-performing robot of FIG. 1 are well known and form no part of this invention, they are not further discussed in detail herein, except to the extent necessary to an understanding of the flow charts of FIGS. 4 and 5.

Figure 2:
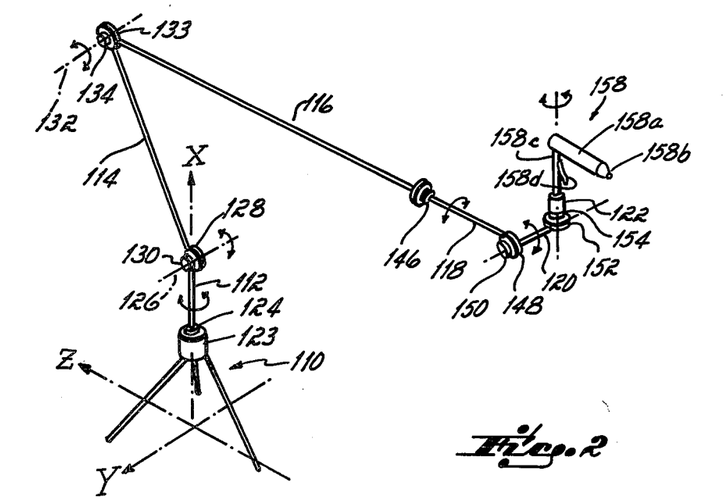
FIG. 2 is a perspective view, in schematic form, of a lightweight, hand manipulable simulator robot, or training arm, showing the general relationship of the simulator links and associated position transducers.

The robot simulator, or training arm, shown in FIG. 2, which is useful in preparing a programmed sequence of motions for input to the work robot for execution thereby relative to a workpiece, includes a tripod base 110 from which extends vertically a link 112 which is connected to the base for rotational movement about a vertical axis by a rotary joint 123. A position transducer 124 associated with the link 112 and base 110 provides an electrical signal correlated to the actual angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the actual angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the actual angular position of the link 116 with respect to the link 114.

Also included in the robot simulator depicted in FIG. 2 are links 118, 120, and 122 which are pivotally connected to links 116, 118, and 120, respectively, via rotary joints 144, 148, and 152, respectively. Angular position transducers 146, 150, and 154 associated with the rotary joints 144, 148, and 152, respectively, and the links 118, 120, and 122, respectively, provide electrical signals correlated to the actual angular position of the links 118, 120, and 122 with respect to the links 116, 118, and 120, respectively.

Mounted to the link 122 is a spray gun 158 having a barrel 158a, a nozzle 158b, and a handle 158c which mounts an ON/OFF switch 158d.

The length of the links 112, 114, 116, 118, 120, and 122 of the simulator robot of FIG. 2 are identical to the lengths of the links 12, 14, 16, 18, 20, and 22, respectively, of the work-performing robot shown in FIG. 1. Of course, the mass of the links 112, 114, 116, 118, 120, and 122 of the simulator robot of FIG. 2 are a mere fraction of that of their counterpart links 12, 14, 16, 18, 20, and 22 of the considerably more massive work-performing robot shown in FIG. 1. Similarly, the joints 123, 128, 133, 144, 148, and 152 of the simulator robot permit the same type of pivotal motion between their respectively associated links 112, 114, 116, 118, 120, and 122 as their counterpart rotary actuators 23, 28, 33, 44, 48, and 52 provide for their respectively associated links 12, 14, 16, 18, 20, and 22 of the work-performing robot.

When the spray gun 158 is moved manually by an operator grasping the handle 158c thereof through a sequence of motions necessary to spray coat an object, which is possible due to its lightweight construction, the various links 112, 114, 116, 118, 120, and 122 of the simulator robot move through a sequence of motions. Simultaneously, the transducers 124, 130, 134, 146, 150, and 154 of the simulator robot associated with the various simulator robot links 112, 114, 116, 118, 120, and 122 provide electrical outputs corresponding to the actual sequence of positions, or motions, through which the simulator robot links move in the course of manually moving the gun through the positions necessary to coat the object. These transducer signals corresponding to the actual positions of the different simulator robot links can be input directly to the robot controller memory or recorded by any suitable means (not shown in FIG. 2) and thereafter the recorded signals input to the robot controller of the work-performing robot where they are compared with signals correlated to the actual work robot link positions and link position error signals derived for input to the work robot link actuators to cause the work robot links to reproduce the motion of the simulator robot links in the manner previously described.

In the course of moving the gun 158 associated with the simulator robot through the sequence of motions necessary to spray coat the desired object, the operator periodically manually actuates the trigger 158d to permit spray coating material from the gun nozzle 158b. By recording signals corresponding to the position of switch 158d in conjunction with recording the position signals provided by the actual position transducers 124, 130, 134, 146, 150, and 154 of the simulator robot for the entire sequence of motions of the simulator robot links 112, 114, 116, 118, 120, and 122 produced by manual manipulation by the operator of the gun 158, a sequence of coordinated gun switch command signals and desired robot link position signals can be stored. These stored signals can then be input to the robot controller and stored, and subsequently repetitively read out from storage within the robot controller and used for repeating the programmed sequence of motions with the work-performing robot of FIG. 1 to coat the object with gun 58, which sequence of motions was first performed manually by the operator with the simulator robot and gun 158.

The rotary actuators 23, 28, 33, 44, 48, and 52 of the work-performing robot shown in FIG. 1 are typically of the hydraulic type, each including an electrohydraulic servo-valve for controlling the rate and direction of flow of hydraulic fluid therethrough.

Associated with the simulator robot and work robot of an illustrative robot system with which this invention is useful is a robot controller 200, which preferably is a specially programmed microprocessor. The robot controller 200 includes a random access memory (RAM) for storing a programmed sequence of desired or command positions for driving the various work robot links 12, 14, 16, 18, 20, and 22, as well as suitable buffer storage registers for temporarily storing the actual and desired positions of the work robot links and the computed positional errors therebetween which result when the work robot is input with, that is, driven by, the programmed sequence of desired positions stored in the robot controller RAM. Also included in the robot controller 200 are computing means for comparing desired work robot link positions and actual work robot link positions temporarily stored in the buffer registers and deriving in response thereto work robot link position error signals for input to the link actuators 23, 28, 33, 44, 48, and 52 of the work robot. During program generation, teaching or training, signals correlated to the desired work robot link positions 200 from simulator robot transducers 124, 130, 134, 146, 150 and 154 are input to the robot controller on lines 202 via an analog-to-digital converter 203 connected via lines 204 to the simulator robot position transducers. During program execution or playback, signals correlated to the actual work robot link positions from work robot position transducers 24, 30, 34, 46, 50 and 54 are input to the robot controller on lines 205 via an analog-to-digital converter 206 connected via lines 207 to the work robot position transducers, while the work robot link position error signals computed by the robot controller are output to the respective link actuators 23, 28, 33, 44, 48, and 52 of the work robot on lines 207 via a digital-to-analog converter 209 which receives the link position error signals on output lines 210.

The robot controller RAM also stores signals correlated to the desired condition of the ON/OFF switch 58d of the work robot. These ON/OFF switch condition signals are input during program generation to the robot controller RAM on line 211, and are output during program execution from the RAM to the ON/OFF switch 58d of the work robot on line 212.

In a given robot system, both during program recording or training with the simulator robot and program execution or replay by the work robot, the controller 200 processes position command signals at a specific rate, which may be constant or vary with time and/or which may be the same or different during program recording and program execution. For example, and assuming during program execution there is no interpolation by the controller 200 and no relative movement between the object being coated by the robot and the work station whereat the robot is located, the controller position command signal processing rate will be the same during both program recording and program execution. Thus, if there are six robot axes, during program recording the robot controller will sample and store in RAM for each simulator robot axis S simulator robot link position transducer signals (desired positions) per second. Similarly, during program execution the controller will, S times per second for each axis, fetch from RAM a position command (desired position), sample the work robot actual link position, and compute therefrom a position error signal for output to the link actuator. In a typical situation, S is 32, although other controller processing rates can be used if desired.

If interpolation is employed by the controller 200 during program execution to compute additional position commands between a pair of sequential position commands stored in RAM, the number of position commands per axis per second issued to the work robot will be greater than the number of position signals from the simulator robot sampled and recorded by the controller per second per axis.

If there is relative motion between the object being sprayed and the robot work station during program recording and program execution, the position command processing rate of the controller 200 may vary with time if the speed of the conveyor transporting the article being coated is varying with time and it is used to control the rate at which the controller fetches position commands (desired position) from RAM, samples the work robot actual link positions, and computes therefrom position error signals for output to the link actuators of the work robot.

For convenience, during program execution, the rate per axis, at which the controller 200 fetches commands from RAM, samples work robot actual link positions, and computes therefrom position error signals for output to the work robot link actuators is referred to herein as the "controller command processing rate". In practice, the rate during program recording at which the controller 200 samples and stores in RAM the ON/OFF signals output from simulator robot switch 158d, and the rate the controller during program execution fetches from RAM and issues to the work robot ON/OFF switch 58d, the stored ON/OFF signals, are equal to each other as well as to the rate per axis at which the controller during program execution fetches position commands from RAM, samples work robot link actual positions, and computes therefrom position error signals for output to the work robot link actuators.

Assuming it is desired to record a programmed sequence of motions with respect to a workpiece for subsequent execution or replay by the work robot, the workpiece is located at the site of the simulator robot. An operator manipulates the simulator robot through the desired sequence of motions with respect to the workpiece. While the operator is manipulating the simulator robot, the outputs of the link position transducers 124, 130, 134, 146, 150 and 154 of the respective simulator robot links are input to the controller 200 via the A/D converter 203 where they are sampled, buffered and recorded in RAM. Additionally, the condition of the robot simulator ON/OFF switch 158d is input to the controller 200 on line 211 for sampling buffering and recording in RAM. This data collection step 301 is shown in the flow chart depicted in FIG. 4a.

More specifically, the desired analog link position signals on line 204 from the simulator robot are sampled and converted from analog to digital form in the analog/digital converter 203. The analog/digital converter 203 converts the inputs thereto which are in analog form to digital form in a time division multiplex basis. Upon the conclusion of the conversion from analog to digital of a single set of desired link position signals (steps 301 and 302), with a "set" consisting of one desired link position signal per link, the simulator robot ON/OFF switch condition signal on line 211, which is in digital form, is sampled in step 303. The digitized set of desired link position signals and the digital ON/OFF switch condition signal are input to the controller 200 via lines 202 and 211 where they are buffer stored in controller registers and, if necessary, reformatted in step 304 to be compatible with the robot controller 200. A "set" of link position signals and an ON/OFF switch condition signal are collectively referred to thereafter as a "group". The digitized, and if necessary reformatted group of desired link position and ON/OFF switch condition signals are then transferred to the controller RAM in step 305. Once this has been done for a single group of desired link position and ON/OFF switch condition signals, the process is repeated for the next group of desired link position and ON/OFF switch condition signals output from the simulator robot. When all groups of desired link position and ON/OFF switch condition signals output from the simulator robot have been sampled, and/or converted from analog to digital by the analog/digital converter 203, reformatted if necessary, and transferred from the controller buffer registers to the controller RAM, the data collection and storage phase shown in the flow chart depicted in FIG. 4a, which occurs during program recording, is complete.

Following reading, reformatting if necessary, and storage in the controller RAM of all groups of desired link position and ON/OFF switch condition signals output from the recorder 201, the work robot drive phase, or program execution or replay, may be initiated in step 300, as shown in the flow chart of FIG. 4b. The steps 312-319 shown in the flow chart of FIG. 4b are sequentially repeated, at the controller command processing rate, for each group of desired link position and ON/OFF switch condition signals until all groups of a program stored in the controller RAM are executed. Considering only one group of desired work robot link positions and ON/OFF switch condition signals, the robot controller program execution step is now described. Specifically, the desired work robot link position for the first link of the group is retrieved in step 312 from the robot controller RAM. The actual position of the work robot link in question is input via its respective line 207 and A/D converter 206 to the robot controller buffer register in step 313. The desired and actual work robot link positions are then compared and a work robot link position error for that particular link is computed by the robot controller in step 314. The work robot link position error signal is output via its respective line 210 to its respective work robot link actuator in step 315 via D/A converter 209 to position the work robot link.

The foregoing steps 312-315 are repeated in step 317 for each desired work robot link position signal of a group, there being as many desired work robot link position signals in a group as there are work robot links. When all desired work robot link position signals in the group have been processed in the manner indicated, the desired ON/OFF switch condition signal of the group is retrieved in step 318 from the robot controller RAM and transferred in step 319 to the ON/OFF switch 58d of the work robot via line 212, completing the execution of the robot controller program for a single group of desired work robot link position and ON/OFF switch signals. The steps 312-319 of the flow chart shown in FIG. 4b are repeated for each group of desired work robot link position and ON/OFF switch condition signals until all groups of desired work robot link position and ON/OFF switch condition signals have been input to the work robot to drive it through the desired sequence of motions which were programmed with the simulator robot at the workpiece site and stored in the controller RAM during the program recording phase. When this has occurred, the subroutine terminates at step 383. The execution rate for each group of desired work robot link position commands and ON/OFF switch commands is the "controller command processing rate" heretofore defined.

Operation of the robot controller 200 at all times is under control of a main, or supervisory, program which, in addition to controlling, recording and executing a sequence of desired link positions stored in RAM, is also operative to facilitate such things as: turn-on and turn-off of the entire robot system when an appropriate POWER ON/OFF switch (not shown) is activated, continuous monitoring of hydraulic pressure levels in all work robot link actuators, orderly interruption of execution of a stored sequence of link positions by the work robot when a STOP button (not shown) is actuated, control of the orderly flow of data between the various components of the controller (RAM, buffers, etc.) and/or between the work and simulator robots and the controller, effecting various diagnostic, interlock and safety routines, etc. The main or supervisory program is interrupted, as necessary, to accomplish the routines and subroutines shown in FIGS. 4 and 5, as well as the various illustrative functions noted above, in accordance with techniques well known in the art, and therefore is not further discussed herein.

Figure 6:
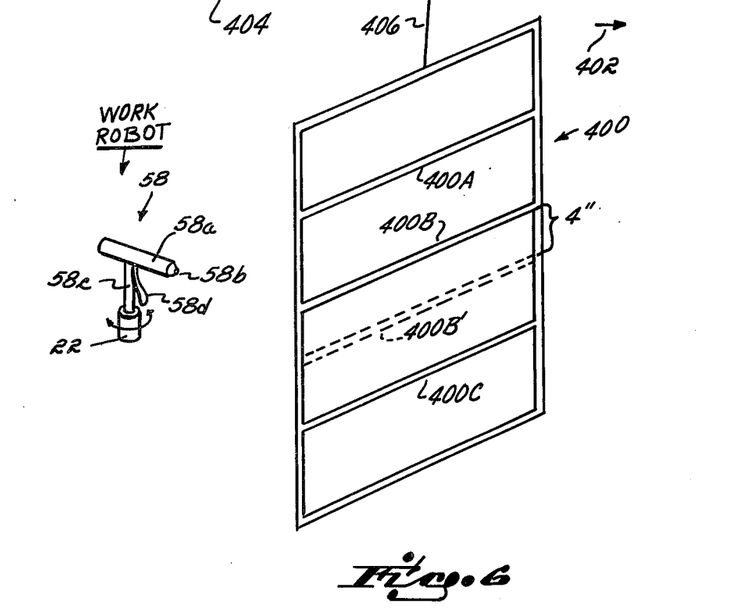
FIG. 6 is a perspective view of a robot work station, including conveyor and workpiece.

To more readily understand the real time position command, stored program, editing method and apparatus of this invention, reference is now made to FIG. 6. This figure schematically depicts a typical work station whereat objects 400 to be coated are transported in a horizontal direction 402 on a moving conveyor 404 from which the objects are suspended by vertically disposed hooks 406 in operative relationship to a spray gun 58 which is secured to the outermost link 22 of a work robot, the remaining links of which are not shown. The need to edit the position commands of a previously generated program now stored in the controller RAM memory is generally unnecessary if there is no change in either the object or its physical orientation with respect to the work robot, particularly the spray pattern of the spray gun 58 mounted thereon. Thus, if the spray gun pattern is unchanged, and if the object 400, which in the illustration consists of a rectangular frame having three horizontal transverse reinforcing members 400a, 400b, and 400c, remains unchanged in structure and its orientation with respect to the spray gun 58 secured to the output robot link 22 as it moves on the conveyor 404 past the work robot also remains unchanged, it is unnecessary to change or modify the robot position commands stored in the controller RAM which were recorded during the program generation phase with the simulator robot, providing of course that the initially generated program now stored in the controller RAM was satisfactory at the outset.

If for some reason the structure of the object 400 is changed, such as by relocation of the transverse member 400b from the solid line position shown in FIG. 6 to the dotted line position, effectively substituting transverse element 400b' for transverse element 400b, the programmed sequence of motions stored in the controller RAM when replayed through the work robot will not properly spray coat relocated transverse element 400b'. The stored program will still properly spray coat the rectangular frame and transverse elements 400a and 400c, since these have not been changed.

Figure 7:
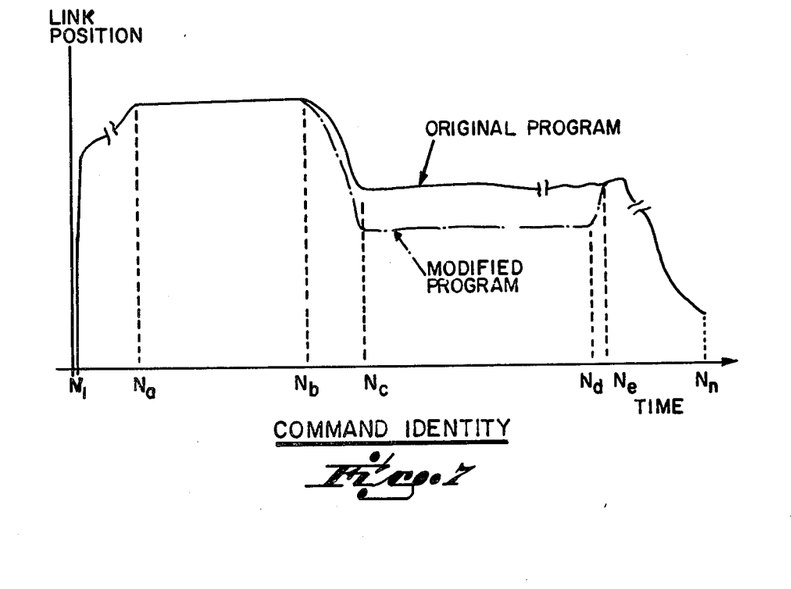
FIG. 7 is a plot of the magnitude of position command versus position command (time) for an illustrative robot program designed to spray coat the workpiece shown in FIG. 6.

To enable satisfactory spray coating of the redesigned object 400, it is necessary to modify the position commands for the work robot links stored in RAM which are used to drive the work robot links during that portion of the stored program when the transverse member 400b is being spray coated by the gun 58. FIG. 7 is a plot of the magnitude of the various command positions of a programmed sequence corresponding to a single link of the work robot, for example, link 16 controlled by actuator 33 on axis 32 which directly affects the vertical position of the gun 58, versus the individual position commands $N_1, \ldots n_a, \ldots N_b, \ldots N_c, \ldots N_d, \ldots N_n$ of the recorded sequence. For illustrative purposes it is assumed that command $N_1$ corresponds to the start of the stored program for link 16 and that command $N_n$ corresponds to the position of link 16 at the end of the program when the entire object 400 has been spray coated. It is also assumed for the purpose of illustration that the commands $N_a, \ldots N_b$ correspond to the position commands for link 16 during the spray coating of the upper transverse element 400a. The commands $N_c, \ldots N_d$ correspond to the commands for link 16 corresponding to spray coating the middle transverse element whether element 400b is in its original location on the object 400 or element 400b' is in its relocated positions. The command $N_b, \ldots N_c$ corresponding to the location of link 16 during the transition between completion of spray coating of upper transverse element 400a and the beginning of spray coating of the middle transverse element 400b or 400b'. Finally, it is further assumed that the commands immediately subsequent to command $N_d$ represent the transitional commands between the termination of spray coating the middle transverse element 400b or 400b' and the beginning of the spray coating operation for transverse element 400c. Spray coating of the rectangular frame, it will be assumed, is accomplished following the spray coating of the transverse members 400a, 400b, and 400c.

While the plot of link position versus command N (time) of FIG. 7 is representative of only a single work robot link, or axis, it is of course understood that similar plots could be made for the remaining five links, or axes, of the work robot corresponding to the respective positions of these remaining links, or axes, during spray coating of the object 400.

As previously noted, the commands $N_c, \ldots N_d$ correspond to spray coating the middle horizontal transverse element 400b or 400b' of the object 400. Assuming the program $N_1, \ldots N_n$ was satisfactory at the outset for spray coating the object 400 in its original form, that is, with intermediate horizontal transverse element 400b, objects having the middle horizontal element in its original position will be satisfactorily spray coated by executing via actuator 33 associated with link 16 the commands $N_c, \ldots N_d$ represented by the solid line, which in FIG. 7 is designated "original program". However, objects 400 having the newly located middle horizontal transverse element 400b', which is some measurable distance below the original location of transverse element 400b, will not be satisfactorily coated with the original stored program since the commands $N_c, \ldots N_d$ will drive the spray gun 58 attached to the work robot output link 22 to a vertical position associated with the old position of transverse element 400b, rather than to the new position for transverse element 400b'. The remaining program commands $N_1, \ldots N_c$ and $N_d, \ldots N_n$ for link 16 will properly coat the transverse elements 400a and 400c and the rectangular frame since there has been no change in the position of these portions of the object 400.

In accordance with the principles of this invention, the original commands between $N_c$ and $N_d$ designated "original program" in FIG. 7 are modified, or edited, during processing of the program by the controller immediately prior to input to the robot, such that the original program, as modified, which is designated "modified program" is both executed by the robot and stored in the controller RAM for subsequent replay. Thus, the original commands between command $N_c$ and command $N_d$ designated "original program" are effectively removed from storage in the controller RAM and substituted in their place are new, modified, commands $N_c, \ldots N_d$, designated "modified program", concurrently with execution of the program, as modified, by the robot. Modification, or editing, of the position commands is accomplished by incrementing the value of the position commands $N_c, \ldots N_d$, either increasing or decreasing as necessary, on a cumulative basis while the program is being processed by the controller, and prior to output of the modified commands to the robot for execution, with the cumulative incrementing being continued until the spray gun 58 is positioned to properly spray the newly positioned transverse element 400b'.

To accomplish the position command incrementing function while the program stored in the controller RAM is actually being processed by the controller and prior to execution of the program, as modified, by the work robot, the robot controller 200 is provided with a position increment input source 430, preferably a free-running clock pulse source, a manually activated, positive increment switch 432, a manually activated, negative increment input switch 434, and a manually activated return switch 435. Also provided is an increment accumulating counter 436 which accumulates, or totals, on a continuing basis the position increments provided by the source 430. Associated with the increment accumulating counter 436 is a counter control circuit 440 which determines whether the increment accumulating counter 436 functions to increase or decrease the count in the counter 436 in response to each position increment pulse from the source 430 which is input to the counter. The counter control 440 is responsive to the outputs from the positive increment switch 432, the negative increment switch 434, and the return switch 435. When the positive increment switch 432 has been actuated to increase the magnitude of the position commands, the position increment input signals from the source 430, which as noted are preferably in the form of pulses, will be added to the count in the counter 436. Similarly, if the negative increment switch 434 has been activated, the position increment input signal pulses from the source 430 will be subtracted from the count in the increment accumulating counter 436. The longer the duration the positive increment and negative increment switches are activated, the larger the cumulative increment count, either positive or negative, in the counter 436. The return switch 435, when activated, causes the increment accumulating counter 436 to upcount or downcount, as necessary, in response to position increment pulse inputs thereto from the source 430 until the cumulative increment count in the increment accumulating counter 436 has reached zero, after which time the increment accumulating counter 436 ignores the input pulses from the position increment input source 430.

To facilitate modification of the position commands stored in the controller RAM by the values reflected by the accumulated count in the increment accumulating counter 436, the position commands stored in the controller RAM are sequentially fetched and stored in a fetched command buffer 444 which functions as one input to an adder 438, the other input to the adder being from the increment accumulating counter 436. The adder 438 modifies, additively or subtractively, depending on whether the positive increment switch 432 or the negative increment switch was activated, at the controller command processing rate, fetched commands for a given robot link, which are sequentially temporarily stored in the fetched command buffer 444, by the cumulative position increment then stored in the accumulating counter 436 at the time the fetched command in question is modified. The modified position command is then substituted in the controller RAM for the original position command which was fetched and temporarily stored in the fetched command buffer.

In operation, and assuming that the stored program in the controller RAM is being processed in the controller 200 and executed by the work robot and further that the program has advanced to the point where command $N_b$ has been processed and executed, which corresponds to the termination of painting of transverse element 400a, the program is in the transition stage between completion of painting of element 400a and the beginning of painting of element 400b. At this point, since it is desired to have the spray gun 58 advanced to a position to spray the transverse element 400b' located below the position of former element 400b, the negative increment switch 434 is activated when command $N_b$ is being processed by the controller 200 corresponding to the point in time at which transverse element 400b has been finished. Activation of the negative increment switch 434 causes the counter circuit 440 to control the increment accumulating counter 436 in a manner such that position increment input pulses from the source 430 are negatively accumulated by the counter 436 which heretofore presumably had a zero count in it.

Assuming the position increment input source 430 provides to the counter 436 one pulse each time a command N for link 16 is processed by the controller, and further assuming that each such pulse input to the counter 436 from the source 430 has associated with it a positional value of ⅛ inch, during the processing of command $N_b$ for link 16 the counter 436 will have accumulated a count of $-1$. This count of $-1$ in the counter 436 is effectively subtracted by adder 438 from the positional value of command $N_b$ for link 16 fetched from the controller RAM which is temporarily stored in the fetched command buffer 444. The content of the adder 438 which represents the modified value of command $N_b$ for link 16 is substituted in the controller RAM for the original position command $N_b$ which, in a manner to become apparent hereafter, is then used to drive the robot actuator 33 associated with robot link 16. Since the negative increment switch 434 remains actuated until the spray gun 58 is properly o positioned to spray transverse element 400b', as each position command $N_{b+1}, N_{b+2}, \ldots$ is processed by the controller at the controller command processing rate, a pulse from the position increment input source 430 is negatively accumulated in the increment accumulating counter 436 such that increasingly larger negative counts are successively subtracted by the adder 438 from the successively fetched commands for link 16 sequentially input to the fetched command buffer 444. Since the modified commands output from the adder 438 are returned to the controller RAM, modified position commands of increasingly negatively modified value are substituted in the controller RAM for the original commands. This process is continued by continued activation of the negative increment switch 434 until the spray gun 58 has reached a position appropriate for properly coating the lower transverse element 400b'. If a total adjustment in position of four inches was required to accommodate lowering of the middle bar from position 400b to position 400b', a total of thirty-two position commands must be modified, since only ⅛" modification per command is possible in the assumed illustration.

When the thirty-two position commands $N_b, N_{b+1}, N_{b+2}, \ldots N_{b+31}$ for the actuator 33 associated with link 16 have been modified sufficiently to properly position the spray gun 58 in proper spraying relation to the transverse element 400b', that is, lower it four inches, the negative increment switch 434 is deactuated. With switch 434 deactuated, the position increment input pulses from the source 430 input to the increment accumulating counter 436 are ineffective to alter the count in the increment accumulating counter during processing of successive position command signals. However, the accumulated count in the increment accumulating counter 436 remains at the value accumulated, at the point when the negative increment switch 434 was deactivated, which in the present illustration is "$-32$." Thus, position commands processed following deactivation of the negative increment switch 434 will be modified equal amounts corresponding to the unchanging accumulated count of "$-32$" in the increment accumulating counter 436. Assuming the negative increment switch 434 was deactivated corresponding in time to processing of command $N_c$, this at, command $N_{b+31}$, the command $N_c$ and commands subsequent thereto will be negatively offset by a value corresponding to the count of "−32" accumulated in counter 436, with the result that the path of the gun 58 attributable to the position of actuator 33 associated with link 16, will move along a four inch lower path indicated by the dotted line designated "modified program" in FIG. 7 which is parallel to the solid line path indicated by designation "original program" in FIG. 7. Stated differently, the spray gun 58 will move along a path properly position to spray coat transverse element 400b', which path is parallel to, but four inches below, the original path corresponding to the location of transverse element 400b.

At the conclusion of the spraying of transverse element 400b', which corresponds to command $N_d$, it is desired to have execution of the stored program be such that the spray gun 58 returns to the originally programmed position for spray coating transverse element 400c which remains in its original position on the object 400. To accomplish this in an automatic fashion, the return switch 435 is momentarily activated. Upon activation of the return switch 435 the counter control 440 is operative to cause successively input pulses to the counter 436 from the position increment input source 430 to reduce the count therein until a count of zero is reached. Once a count of zero is reached in the counter 436, further pulses from the position increment input source 430 are ineffective to modify the count in the counter 436. Since, in the illustration provided, the counter 436 had accumulated a negative count of "−32" to effectively reduce the values of position command for the link 16 by four inches, upon actuation of the return switch 435 the counter control 440 will cause increment pulses from the source 430 input to the counter 436 to reduce the negative count therein at the rate of one pulse (⅛ inch) per command until the count in the counter 436 has reached zero.

The effect of the foregoing automatic reduction of count in counter 436 is that position commands $N_d$, $N_{d+1}$, $N_{d+2}$, . . . executed subsequent to actuation of the return switch 435 will have their values successively reduced by increasingly smaller values until the counter 436 reaches zero. As a consequence, during the interval between command $N_d$ when the return switch 435 was activated and a subsequent count $N_e$ when the counter 436 has reached zero, the modified position commands output from the adder 438 will have increasingly larger positional values causing the spray gun 58 to return from the dotted line path designated "modified program" shown in FIG. 7 to the solid line path designated "original program" shown in FIG. 7. Following command $N_e$, and assuming switches 432, 434, and 435 are not further activated, the position commands $N_e$, $N_{e+1}$, fetched from the controller RAM for temporary storage in the fetched command buffer 444 will not be modified, but will be returned to the controller RAM with their original values, and the position of the gun 58 during the command interval $N_e$, . . . $N_n$ will proceed along the original solid line path designated "original program" in FIG. 7 to complete the remaining portion of the object 400 which remains oriented relative to the work robot in the position it occupied at the time the program was initially recorded when the object 400 had the solid line configuration shown in FIG. 6, that is, with the middle bar 400b.

Preferably, the positive increment and negative increment switches 432 and 433 are interlocked, mechanically, electrically, or otherwise, such that only one of the two switches can be activated at any time. Additionally, the return switch 436 is interlocked with the positive and negative increment switches 432 and 434 to preclude simultaneous activation of the return switch and one or the other of the positive or negative increment switches. Alternatively, if the positive and negative increment switches 432 and 434 are of the bistable type, rather than of the mono-stable type which must be continuously pressed to provide continuous activation, the return switch can be operative such that when activated it automatically resets or returns to the inactive position the increment switches 432 and 434 should one of them be activated when the return switch is activated.

If instead of activating the negative increment switch 434 in the illustration described above, the positive increment switch 434 had been activated, operation of the circuit would have been the same except that the counter control 440 would have caused the increment accumulating counter 436 to accumulate a positive count in response to input of position increment pulses from the source 430. The positive count accumulated in counter 436 would increase the value of a position command fetched from the controller RAM, which is temporarily stored in the fetched command buffer 444, as a result of the operation of the adder 438 which is input with both the cumulative increment count in counter 436 and the original position command fetched from the RAM which is now temporarily stored in the fetched command buffer. The modified position commands, now larger in value than originally, when returned to the RAM and subsequently used in execution of the program, in a manner to be described, will cause the actuator 33 associated with axis 32 to position the spray gun 58 above its original position. Similarly, when the return switch 435 is activated following deactivation of the positive increment switch 432, the counter control 440 will be operative to cause the count in the increment accummulating counter 430 to be reduced toward a zero count as subsequent position commands are fetched from RAM, modified, and returned to RAM for subsequent execution.

Figure 5:
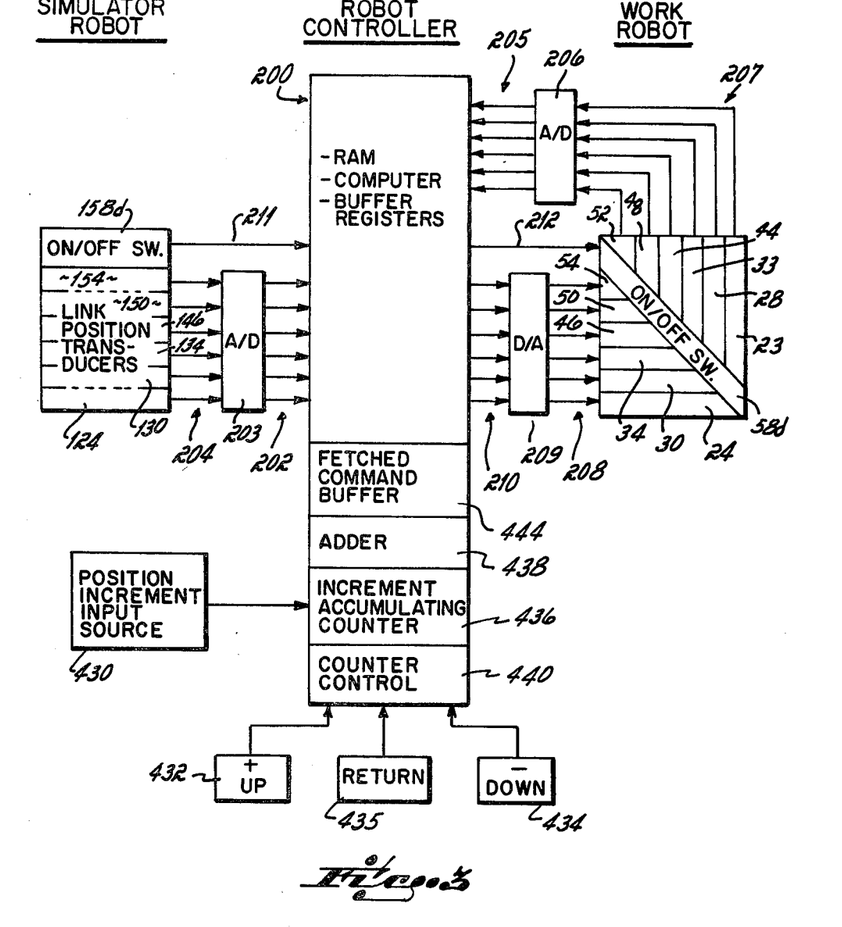
FIG. 5a is a flow chart of robot controller program execution with position command editing in accordance with an embodiment of the invention.
FIG. 5b is a flow chart of a positive/negative increment switch subroutine for an embodiment of the invention.
FIG. 5c is a flow chart of a return switch subroutine for an embodiment of the invention.
Figure 5A:
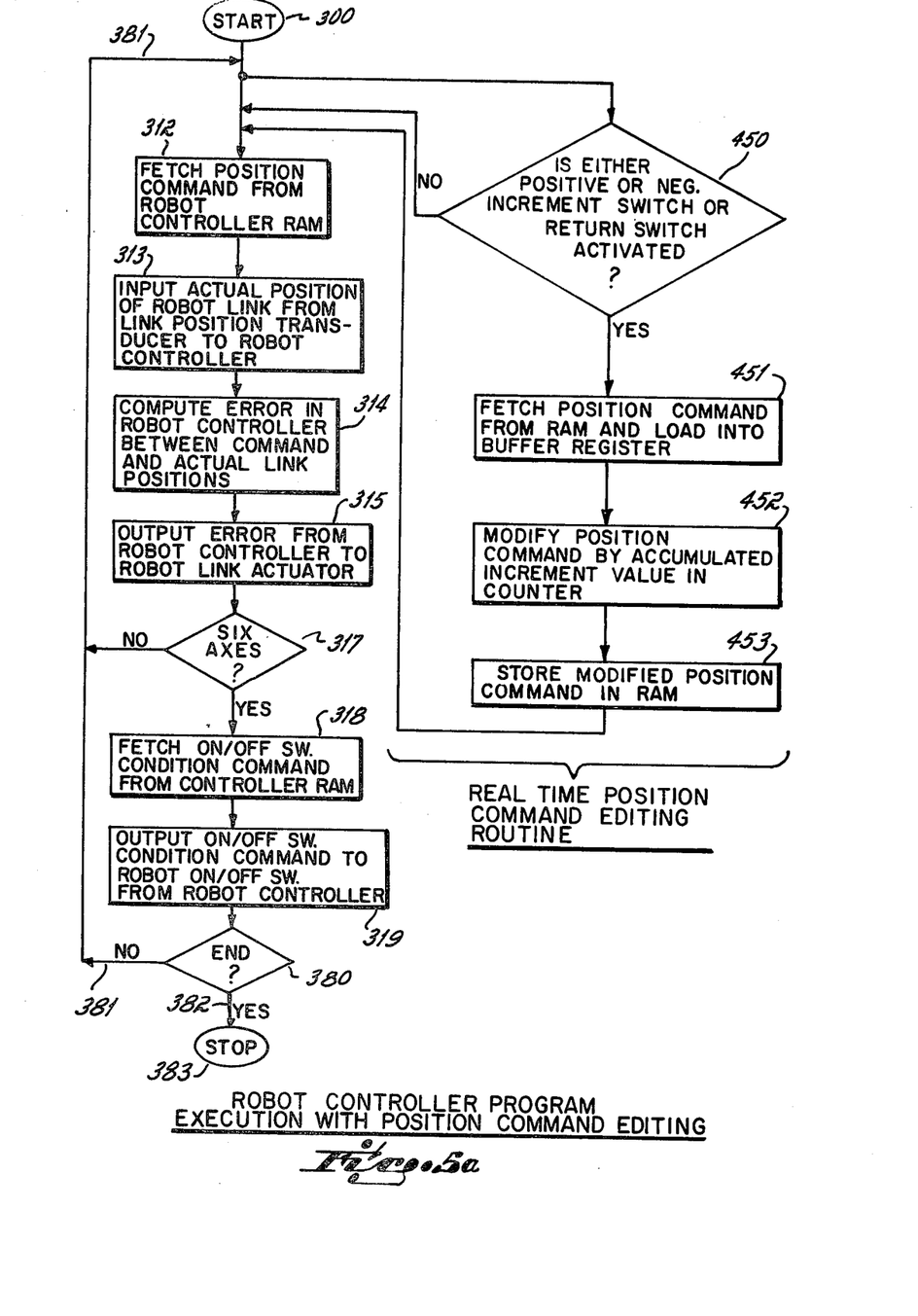

Robot controller program execution with real time position command editing is now described in conjunction with the flow chart of FIG. 5A. At the start of program execution represented by step 300, the status of the positive and negative increment switches 432 and 434, as well as the return switch 436, is checked as represented by step 450. If either of these switches is currently activated, the program execution phase returns to step 312 in which the position command stored in the ARM is fetched (step 312) and the actual position of the robot link is sampled and input to the robot controller (step 313) where the error between the command and actual work robot link positions is then calculated (step 314) and the error output to the work robot link actuator (step 315) to position it to the command position. This series of steps 312–315 is repeated for each of the six axes of the work robot with an intervening status check of the positive and negative increment switches 432 and 434 and the return switch 435 between each execution of the group of steps 312–315 for each of the remaining axes.

If either the positive or negative increment switch 432 and 434, or the return switch 436, is activated during the check step 450, the position command is fetched from the controller RAM and loaded into the buffer register in step 451. Thereafter, the fetched position command is modified in accordance with the accumulated position increment value in counter 436 (step 452). The modified position command is then returned to the RAM for storage as a substitute for the original position command (step 453). The real time position command editing routine is now complete for this particular command and steps 312–315 are sequentially completed to effectively execute the modified position command with the work robot link.

When all six axes of a position command have been executed, in either their original or modified form, the ON/OFF switch condition command stored in the controller RAM is fetched (step 318) and output to the robot ON/OFF switch device 58d from the robot controller (step 319).

If there are still unexecuted position and ON/OFF switch condition commands in the controller RAM, the robot controller program execution routine is reentered on line 381. If no commands, position and ON/OFF switch condition, remain unexecuted, the stored program execution phase is terminated and the routine proceeds to stop at step 383.

Figure 5B:
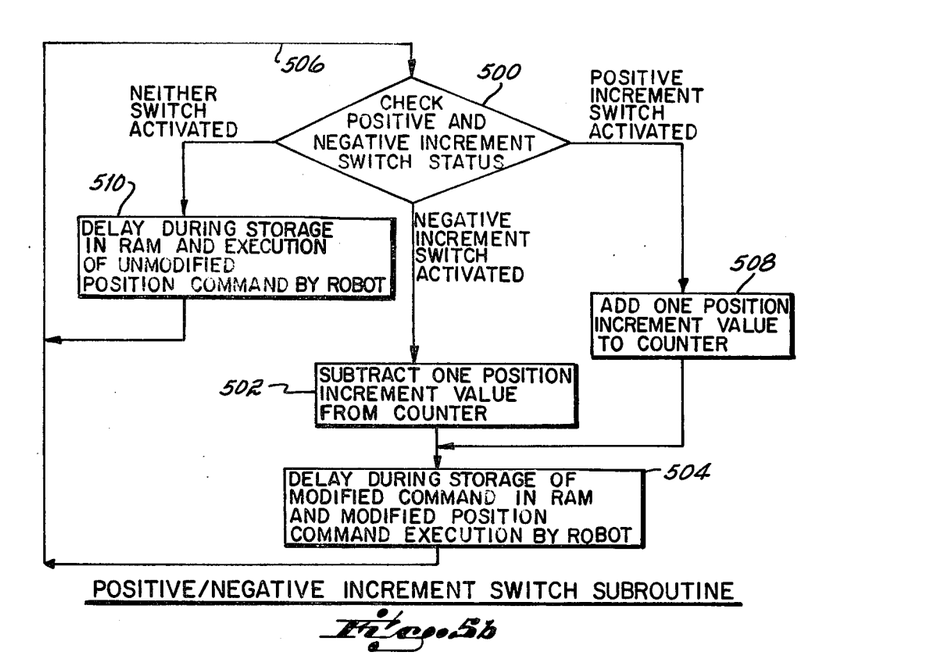

The positive/negative increment switch subroutine is shown in FIG. 5b. This subroutine is executed every time step 452 of the real time position command editing routine is executed, and prior to the execution of steps 312–315 for position commands of each robot axis. In accordance with this subroutine, the status of the positive and negative increment switches 432 and 434 is checked in step 500. If the negative switch 434 is activated, one position increment value is subtracted from the increment accumulating counter 436 in step 502. Following a suitable delay in step 504 to facilitate storage of a modified position command in RAM and subsequent execution of the modified command by the robot, the subroutine is reentered on line 506. If a check of the status of the positive and negative increment switches 432 and 434 reveals that the positive increment switch 432 is currently activated, one position increment value is added to the counter 436 in step 508. Following a delay in step 504 corresponding to storage of a modified position command to the RAM and subsequent execution of the modified command by the robot, the subroutine is reentered on line 506. If a check of the status of the positive and negative increment switches 432 and 434 shows that neither switch is currently activated, the subroutine is reentered on line 506 following a delay in step 510 sufficient to permit storage in the RAM, and execution by the robot, of the unmodified position command. This subroutine continues to be executed until all position commands in RAM are fetched, modified if appropriate, stored in RAM, and executed by the robot.

Figure 5C:
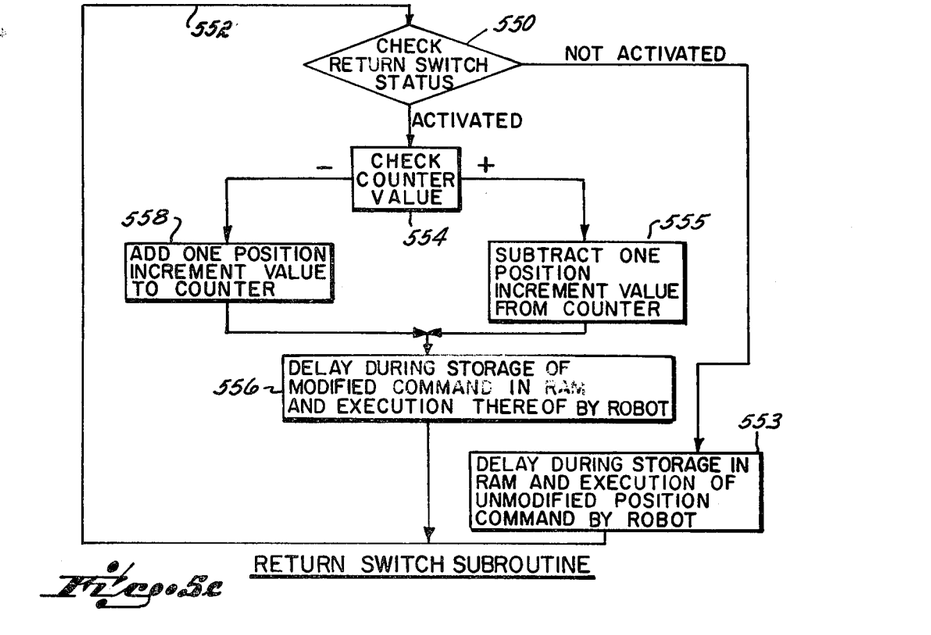

The return switch subroutine shown in FIG. 5c, like the positive/negative increment switch subroutine shown in FIG. 5b, is executed every time step 452 of the real time position command editing routine is carried out. In accordance with the return switch subroutine, the status of the return switch 435 is checked in step 550. If the return switch 435 is not currently activated, the subroutine is reentered on line 552 following a delay in step 553 sufficient to permit storage in RAM and execution of the unmodified position command. If a check of the status of the return switch 435 reveals that this switch is currently activated, the cumulative increment value currently in the counter 436 is checked in step 554. If the count in the counter 436 is positive, one position increment is subtracted from the count in the counter 436 in step 555. Following a delay in step 556 sufficient in duration to facilitate storage of the modified command to RAM and execution thereof by the robot controller, the return switch subroutine is reentered on line 552. If the return switch 435 has been activated and a check of the counter 436 shows that it has a negative count, one position increment value is added to the counter 436 in step 558, and following a suitable delay in step 556 to permit storage of the modified command in RAM and subsequent execution thereof by the robot, the return switch subroutine is reentered on line 552. The subroutine continues to be reexecuted until all position commands in the RAM are fetched, modified if appropriate, stored in RAM and executed by the robot.

If the object 400 to be coated has remained unchanged in configuration, but the nozzle of the spray gun 58 has been changed such that the spray pattern is now shifted three inches vertically upward at the point it reaches the object 400, the situation is effectively the same as if the hanger 406 on which the object is supported had been shortened by three inches relative to the gun 58. To modify the stored program to compensate for this change, the positive increment switch 432 is activated until the spray pattern at the point it intersects the object 400 has been raised three inches. At this point, the positive increment switch 432 is deactivated. Assuming the return switch 435 is left in its deactivated state for the remainder of the program, the three inch cumulative program modification existing at the time the positive increment switch 432 is deactivated will continue to be applied to modify all subsequent position commands without further operator intervention. Thus, and assuming the three inch modification is accomplished before actual emission of spray coating from the gun, the article sprayed during program modification as well as all subsequent articles will be properly spray coated by the modified program.

The number of pulses input from source 430 to the counter 436 per command modification interval can be varied depending on the rate it is desired to increment, or modify, a position command per command modification interval. A command modification interval corresponds to the interval required to fetch a command from RAM, modify it, return it to RAM in modified form and process the modified command in the controller for execution by the robot. Modification of the number of pulses input to the counter 436 could be done easily with a keyboard entry were the clock pulse source 430 implemented in software in the microprocessor based controller.

While the switches 432, 434 and 435 have been described as mono-stable and/or bi-stable switches, other expedients are possible. For example, equivalent commands could be given by an operator by appropriate keyboard entry in an alphanumeric keyboard input to the microprocessor-based robot controller. Similarly, the counter 436, while described as an up/down counter, could be implemented totally in software in the robot controller.

Having described the invention, what is claimed is:

1. A controller for driving an articulated robot link under closed loop servo control in response to a stored sequence of recorded link position commands, the robot link having associated therewith a signal-responsive link actuator and a link position feedback transducer which provides a feedback signal correlated to link position, said controller having real time link position command editing capability, comprising:

means to store a sequence of recorded robot link position commands,     means to sequentially retrieve robot link position commands from said storage means,     means responsive to a retrieved link position command and the link position feedback signal input from the link position feedback transducer for calculating a link position error signal for input to the link actuator to drive the link to a command position,     accumulating means, including a manually-activated switch means, for accumulating periodic positional increments for the duration said switch means is activated, said accumulating means providing successive outputs correlated to the successive cumulative positional increment therein,     means responsive to said successive cumulative positional increment outputs for modifying successively retrieved link position commands in accordance with the successive cumulative positional increments in said accumulating means,     means for effectively substituting said modified link commands in said storage means for their respectively associated, previously retrieved link position commands, and     means for inputting on an interleaved basis both retrieved link position commands which were not modified and modified link position commands into said calculating means in the sequence in which said unmodified link position commands and modified link position commands were retrieved and modified, respectively, said inputting means being operative substantially concurrently with said retrieving means and modifying means to facilitate driving said robot with said sequence of interleaved modified and unmodified link position commands while said manually-activated switch means is activated to effectively manually modify link position commands of a recorded sequence on a real time basis while said controller is processing said recorded sequence for execution by said robot.

2. The controller of claim 1 wherein said accumulating means preserves the cumulative positional increment therein existing at the time said manually-activated switch means is de-activated for providing thereafter successive constant value outputs correlated to said preserved cumulative positional increment, whereby all subsequently retrieved link position commands are modified by said constant cumulative positional increment notwithstanding de-activation of said manually-activated switch means.

3. The controller of claim 1 wherein said accumulating means includes:

selectively manually operable negative/positive increment switch means for selectively accumulating negative positional increments and positive positional increments, whereby said robot link position commands can be selectively negatively and positively modified to effectively bidirectionally modify the position of said robot link on a real time basis under manual control when said controller is processing said recorded sequence for execution by said robot.

4. The controller of claim 1 wherein said accumulating means includes:

selectively manually operable negative/positive increment switch means for selectively accumulating negative positional increments and positive positional increments, whereby said robot link position commands can be selectively negatively and positively modified to effectively bidirectionally modify the position of said robot link on a real time basis under manual control when said controller is processing said recorded sequence for execution by said robot, and     wherein said accumulating means preserves the cumulative positional increment therein existing at the time said manually-activated switch means is de-activated for providing thereafter successive constant value outputs correlated to said preserved cumulative positional increment, whereby all subsequently retrieved link position commands are modified by said constant cumulative positional increment notwithstanding de-activation of said manually-activated switch means.

5. The controller of claim 1 wherein said accumulating means successively reduces, until zero, the cumulative positional increment therein existing at the time said manually-activated switch means is de-activated for providing thereafter successively reduced outputs until zero is reached, whereby subsequent to de-activation of said switch means retrieved link position commands are modified by said successively reduced cumulative increments until a zero cumulative increment output is reached whereafter subsequently retrieved link position commands are not modified without re-activation of said manually-activated switch means.

6. The controller of claim 1 wherein said accumulating means includes:

selectively manually operable negative/positive increment switch means for selectively accumulating negative positional increments and positive positional increments, whereby said robot link position commands can be selectively negatively and positively modified to effectively bidirectionally modify the position of said robot link on a real time basis under manual control when said controller is processing said recorded sequence for execution by said robot, and     selectively manually operable return switch means for controlling said accumulating means to successively reduce, until zero, the cumulative positional increment therein existing at the time said return switch means is activated for providing thereafter successively reduced outputs until zero is reached, whereby subsequent to activation of said return switch means retrieved link position commands are modified by said successively reduced cumulative increments until a zero cumulative increment output is reached whereafter subsequently retrieved link position commands are not modified without re-activation of said manually-activated switch means.

7. The controller of claim 6 wherein said accumulating means preserves the accumulated positional increment therein existing at the time said positive/negative switch means is de-activated for providing thereafter until said return switch means is activated successive constant value outputs correlated to said preserved cumulative positional increment, whereby link position commands retrieved after de-activation of said positive/negative switch means and before activation of said return switch means are modified by said constant cumulative positional increment notwithstanding de-activation of said positive/negative switch means.

8. A method of editing on a real time basis, link position commands of a sequence stored in a robot controller while the controller is processing the commands and driving an articulated robot link under closed loop servo control in response to the commands, as modified, the robot link having associated therewith a signal-responsive link actuator and a link position feedback transducer which provides a feedback signal correlated to link position, said method comprising the steps of:

sequentially retrieving robot link position commands from storage in a controller memory, accumulating, in response to manual activation of switch means, periodic positional increments for the duration the switch means is activated, and providing successive outputs correlated to the successive cumulative positional increments, modifying, in response to successive cumulative positional increment outputs, successively retrieved link position commands in accordance with the successive cumulative positional increment, effectively substituting the modified link commands in the controller memory for their respectively associated, previously retrieved link position commands, inputting into calculating means of the controller substantially concurrently with retrieving and modifying link position commands, both retrieved link position commands which were not modified and modified link position commands on an interleaved basis in the sequence in which the unmodified link position commands and modified link position commands were retrieved and modified, respectively, calculating, in response to the interleaved sequence of modified and unmodified link position commands, the error between the actual link positions and the command positions, and driving the robot link actuator with the errors derived from the actual link positions and the sequence of interleaved modified and unmodified link position commands while the manually-activated switch means is activated to effectively manually modify link position commands of a recorded sequence on a real time basis while the controller is processing the recorded sequence for execution by the robot.

9. The method of claim 8 wherein the accumulating step includes preserving the cumulative positional increment existing at the time the manually-activated switch means is de-activated, and providing thereafter successive constant value outputs correlated to the preserved cumulative positional increment, whereby all subsequently retrieved link position commands are modified in said modifying step by said constant cumulative positional increment notwithstanding de-activation of the manually-activated switch means.

10. The method of claim 8 wherein said accumulating step includes:

selectively accumulating negative positional increments and positive positional increments in response to selective manual activation of negative/positive increment switch means, whereby the robot link position commands are selectively negatively and positively modified in said modifying step to effectively bidirectionally modify the position of the robot link on a real time basis under manual control when the controller is processing the recorded sequence for execution by the robot.

11. The method of claim 8 wherein the accumulating step includes:

selectively accumulating negative positional increments and positive positional increments in response to selective manual activation of negative/positive increment switch means, whereby the robot link position commands are selectively negatively and positively modified during said modifying step to effectively bidirectionally modify the position of the robot link on a real time basis under manual control when the controller is processing the recorded sequence for execution by the robot, and preserving the cumulative positional increment existing at the time the manually-activated switch means is de-activated, and thereafter providing successive constant value outputs correlated to the preserved cumulative positional increment, whereby all subsequently retrieved link position commands are modified in said modifying step by the constant cumulative positional increments notwithstanding de-activation of the manually-activated switch means.

12. The method of claim 8 wherein the accumulating step includes successively reducing, until zero, the cumulative positional increment existing at the time the manually-activated switch means is de-activated, and providing thereafter successively reduced outputs until zero is reached, whereby subsequent to de-activation of the switch means retrieved link position commands are modified in said modifying step by said successively reduced increments until a zero cumulative increment output is reached whereafter subsequently retrieved link position commands are not modified in said modifying step without re-activation of said manually-activated switch means.

13. The method of claim 8 wherein the accumulating step includes:

selectively accumulating negative positional increments and positive positional increments in response to selective manual activation of negative/positive increment switch means, whereby the robot link position commands are selectively negatively and positively modified during said modifying step to effectively bidirectionally modify the position of the robot link on a real time basis under manual control when the controller is processing the recorded sequence for execution by the robot, successively reducing to zero, in response to selective manual activation of a return switch means, the cumulative positional increment existing at the time the return switch means is activated, and providing thereafter successively reduced outputs until zero is reached, whereby subsequent to activation of said return switch means retrieved link position commands are modified in said modifying step by the successively reduced increments until a zero cumulative increment output is reached whereafter subsequently retrieved link position commands are not modified in said modifying step without re-activation of said manually-activated switch means.

14. The method of claim 13 wherein the accumulating step includes preserving the cumulative positional increment existing at the time the positive/negative switch means is de-activated, and providing thereafter until the return switch means is activated successive constant value outputs correlated to the preserved cumulative positional increment, whereby link position commands retrieved after de-activation of the positive/-negative switch means and before activation of said return switch means are modified in said modifying step by the constant cumulative positional increment notwithstanding de-activation of said positive/negative switch means.

* * * * *